United States Patent [19]

McCarthy et al.

[11] Patent Number: 4,885,725

[45] Date of Patent: Dec. 5, 1989

[54] POSITION MEASURING APPARATUS AND METHOD

[75] Inventors: Brian D. McCarthy; Bernard J. Regan, both of Surrey, England

[73] Assignee: MS Instruments public limited company, England

[21] Appl. No.: 124,935

[22] PCT Filed: Mar. 12, 1987

[86] PCT No.: PCT/GB87/00169

§ 371 Date: Nov. 12, 1987

§ 102(e) Date: Nov. 12, 1987

[87] PCT Pub. No.: WO87/05706

PCT Pub. Date: Sep. 25, 1987

[30] Foreign Application Priority Data

Mar. 12, 1986 [GB] United Kingdom ............... 8606100

[51] Int. Cl.$^4$ .............................................. G01S 5/18
[52] U.S. Cl. ..................................... 367/129; 367/127; 367/906; 273/372
[58] Field of Search ................. 367/89, 117, 118, 121, 367/124, 129, 906, 127; 273/372

[56] References Cited

U.S. PATENT DOCUMENTS

| 3,545,000 | 12/1970 | Heflinger ........................ 367/906 |
| 3,778,059 | 12/1973 | Rohrbaugh et al. ............. 367/906 |
| 4,261,579 | 4/1981 | Bowyer et al. .................. 367/906 |
| 4,307,292 | 12/1981 | Knight et al. ................... 367/906 |
| 4,350,882 | 9/1982 | Phillips ...................... 367/906 X |
| 4,351,026 | 9/1982 | Phillips ............................ 367/906 |

FOREIGN PATENT DOCUMENTS

| 0019423 | 11/1980 | European Pat. Off. . |
| 0064477 | 11/1982 | European Pat. Off. . |
| 2427571 | 12/1979 | France . |
| 2445944 | 8/1980 | France . |
| 2083177 | 3/1982 | United Kingdom . |
| 2105464 | 3/1983 | United Kingdom . |
| 8702144 | 4/1987 | World Int. Prop. O. . |

Primary Examiner—Brian S. Steinberger
Attorney, Agent, or Firm—Nixon & Vanderhye

[57] ABSTRACT

The position of a projectile travelling at a supersonic velocity is sensed by two triangular arrays of transducers 10,11 which are located below and close to the plane of a target area 14 through which the projectile passes. Signals from the transducers are processed to obtain data indicative of the direction of the trajectory from each array. This data can be processed to obtain the position of the trajectory in a cartesian coordinate system.

11 Claims, 4 Drawing Sheets

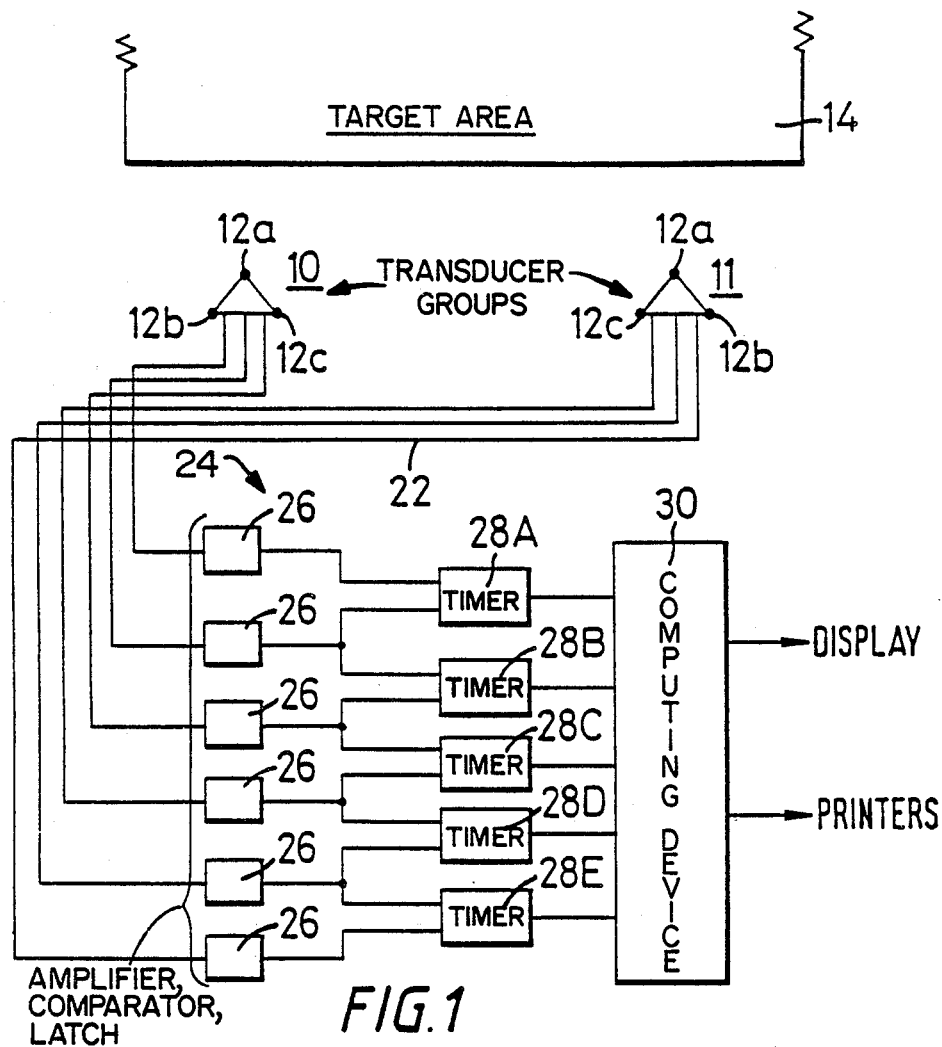
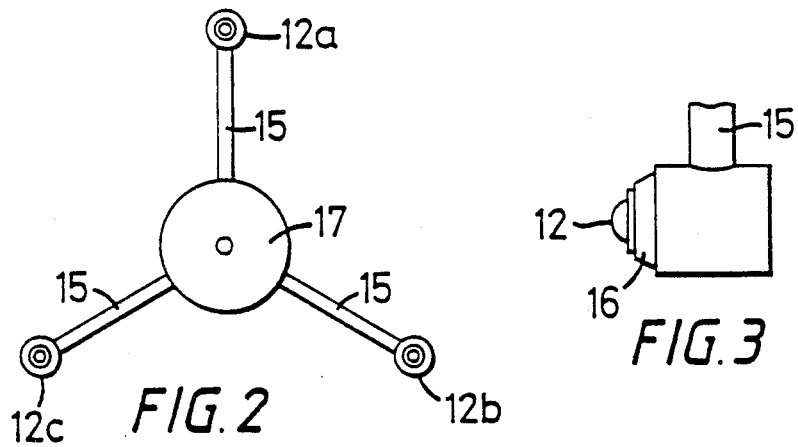

$\sin^{-1}\left(\frac{1}{M}\right) = \gamma$ where M = Mach no. of projectile

POSITION MEASURING APPARATUS AND METHOD

DESCRIPTION

1. Technical Field

This invention relates to apparatus for measuring the position of a projectile travelling at a supersonic velocity.

2. Prior Art

When a supersonic projectile travels through a medium such as the atmosphere it creates a conical shock wave. This shock wave can be detected and used to determine the position of the projectile. Arrangements for detecting shock waves are known and have several Applications. One such Application is in determining the co-ordinates of a bullet as it passes through a given area, e.g. a conventional target on a shooting range. One known apparatus of this type is described in United Kingdom Patent Specification No. 1371173. The arrangement described in this Specification includes a pair of steel bars which are located so that their longitudinal axes lie at an angle to each other. The bars are disposed near the target so that they lie generally in the same plane as the target area or close to that plane. Each bar carries a pair of transducers, one at each end thereof. A projectile such as a bullet passing through the target generates a shock wave which expands and strikes each bar. The shock wave then propagates along each bar to the respective transducers. The apparatus is arranged to measure the arrival times of the shock wave at the transducers and to evaluate from those measured times the point at which the shock wave struck each bar. From this information the position of the bullet can be evaluated. This type of apparatus provides relatively accurate position information but has limitations. In the case of a rifle range both bars need to be below ground level at the target area so that the sensor cannot be struck by the bullets. Because one of the bars is usually upright, the depth required below ground can sometimes make installation difficult. In addition the area covered by the sensor array is limited and outside this area the only information available is that the shot is off target in a certain direction. Another type of system such as that described in United Kingdom Patent Specification No. 2083177 uses an array of transducers which detect the shock wave directly. However known arrangements which use an array of transducers suffer from the fact that the calculation of the projectile position usually involves the velocity of sound in air and the projectile velocity. The projectile velocity can be measured but this will introduce some errors. In addition the velocity of sound in air varies with temperature. Whilst the temperature at ground level can be measured this is not always an accurate representation of the temperature at the transducers. This type of apparatus has been found to be less accurate than apparatus which uses the bar type detector referred to above.

DESCRIPTION OF THE INVENTION

One form of the present invention provides apparatus for sensing the position of supersonic projectiles which uses arrays of transducers but which does not require knowledge of the velocity of sound for the position calculation process.

According to a first aspect of the present invention there is provided apparatus for determining the position of a projectile travelling at a supersonic velocity comprising a plurality of transducers, said transducers being so arranged and disposed that they form two triangular groups which are adjacent to and which lie in or generally parallel to the plane of a target area through which the projectile passes, each transducer being arranged to convert the mechanical impulse of a shock wave from the projectile into an electrical signal or signals, and processing means arranged to receive said electrical signals and to compute from said signals the direction of the projectile from each group of sensors. Knowing the position of each group of sensors relative to the target area it is possible to calculate from the direction information the position at which the projectile passes through the target. Because the apparatus essentially determines two directions the evaluation of the position becomes independent of the velocity of sound. Thus the accuracy with which the position of the projectile is measured does not depend upon the velocity of sound.

The apparatus may comprise two spaced groups each comprising three transducers, the spacing of said groups being large compared with the spacing of the transducers in each group. The triangular arrangement may be right angled triangle. Alternatively it may be an equilateral triangle.

Each group may include a fourth transducer arranged out of the plane of the other three so that information relating to the velocity of the projectile can be derived.

Another form of the invention uses a triangular transducer array in combination with a bar type sensor.

According to a second aspect of the present invention there is provided apparatus for determining the position of a projectile travelling at a supersonic velocity comprises a longitudinally extending member arranged in a generally horizontal plane below a target area, a pair of transducers located on said member, said transducers being at a given distance apart along the length of the member and each transducer being capable of transducing mechanical vibration into electrical signals, a triangular array of transducers which is adjacent and lies in or close to a plane continuing the target area each of said transducers being capable of converting the mechanical impulse of a shock wave into an electrical signal or signals, and means for processing signals from said transducers to provide data indicative of the position of the projectile.

BRIEF DESCRIPTION OF THE DRAWINGS

The invention will be described now by way of example only with particular reference to the accompanying drawings. In the drawings:

FIG. 1 is a schematic illustration of apparatus in accordance with the present invention;

FIG. 2 is a schematic front elevation of a group of transducers used in the arrangement of FIG. 1;

FIG. 3 shows in more detail one of the transducers of the group shown in FIG. 2;

DESCRIPTION OF PREFERRED EMBODIMENT

Figure 4:
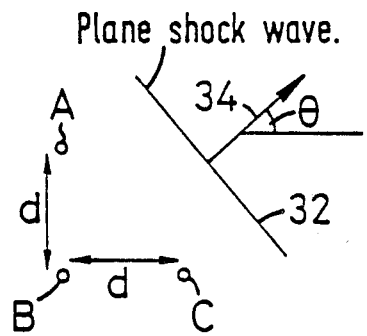
FIGS. 4 to 7 illustrate the operation of the device shown in FIG. 1.

Referring to FIG. 1 the apparatus comprises two groups of transducers 10, 11. Each group comprises three transducers 12 arranged in a triangular configuration as shown in FIG. 2. As shown in FIG. 2 each transducer 12 is mounted on the end of one of three arms 15 which extend radially from a support member 17. The two groups are located below a target area 14 so that they lie generally in the vertical plane of that target area. Each transducer 12 as illustrated in FIG. 3 is mounted on the end of its respective arms 15 in an annular rubber mounting 16. Each transducer comprises a commercially available hemispherical piezo-electric sensor. Each transducer of each group is coupled electrically by lines illustrated at 22 to processing apparatus 24. The processing apparatus can comprise a plurality of amplifier/comparator/latches 26 coupled to timers 28A to 28E which in turn are coupled to a computing device 30. The computing device can drive a display and/or printers in a conventional manner. The connections are such that the transducers 12a and 12b of group 10 are coupled to timer 28A, transducers 12b and 12c of group 10 are coupled to timer 28B, transducers 12a and 12b of group 11 are coupled to timer 28D and transducers 12b and 12c of group 11 are coupled to timer 28E. In addition one transducer of each group is also coupled to timer 28C. The spacings of the transducers are not critical, typically the transducers within each group will have a spacing of 300 mm whilst the groups will be spaced by 1 or 2 metres.

In use when a projectile such as a bullet passes through the target area it generates a shock wave which spreads outwardly from the trajectory of the bullet towards each group of transducers. The shock wave is sensed by each transducer within each group. It will be appreciated that the shock wave arrives at each transducer at a slightly different time. By sensing the time differences in arrival of the shock wave at the transducers it is possible to determine the direction from each group to the trajectory of the projectile. Then knowing the spacing of the groups and the relative position of each group to the target area it is possible to evaluate the position of the projectile. This evaluation, which is carried by the computing device 30, will become clear from the following explanation.

The explanation will be given on the assumption that the transducers of each group 10, 11 are located at the apices of a right-angled triangle. A right-angled triangle is the arrangement which is most easily explained but the solution for an equilateral triangle will also be given although not evaluated.

Referring to FIG. 4 there is shown a right-angled arrangement of three transducers identified as A, B, and C. The shock wave from a supersonic projectile is shown as a plane 32 approaching the transducers. The direction from the transducers towards the trajectory of the projectile is represented by the arrow 34. The angle between this arrow and the horizontal is $\theta$. As will be appreciated the shock wave arrives at transducers A and C before it arrives at transducer B. The timer 28A of FIG. 1 measures the time difference between the arrival of the shock wave at transducer A and its arrival at transducer B whilst the timer 28B measures the difference in the time of arrival at transducer C and transducer B. These times can be evaluated by triggering counters when the shock wave arrives at either transducer A or transducer C and stopping the count of the counters when the shock wave arrives at transducer B. The count of the counters represents the required time interval. This arrangement will be familiar to those skilled in the art and so will not be described in detail.

Figure 5:
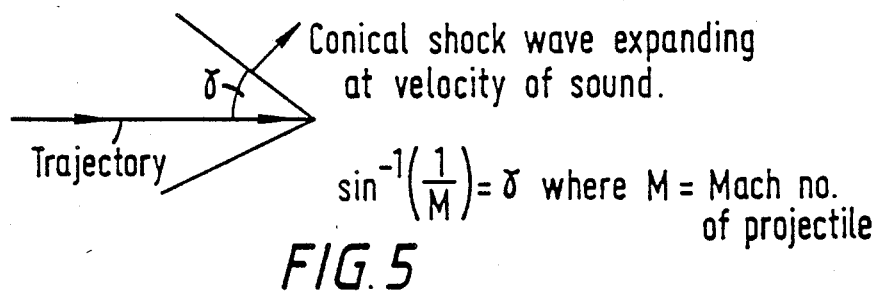

If the time of travel between transducer A and transducer B is $t_1$ and the time difference between C and B is $t_2$ then assuming that the shock wave is planar $$t_1 = \frac{d \sin \theta}{V_e}$$

where $V_e$ is the velocity of expansion of the shock wave in the target plane and $$V_e = \frac{c}{\cos \gamma}$$

where c is the velocity of sound and x is the half cone angle of the shock wave (see FIG. 5) and depends upon the velocity of the projectile. It will be seen that:

$$\tan \theta = \frac{t_1}{t_2}$$

i.e. tan O is independent of the velocity of sound in air and the cone angle x, and depends only on the ratio of times. The above has been given for one group of transducers and it will be appreciated that the same applies for the second group. The relevant times in this case are $t_3$ and $t_4$ which are measured by the timers 28D and 28E shown in FIG. 1.

Figure 6:
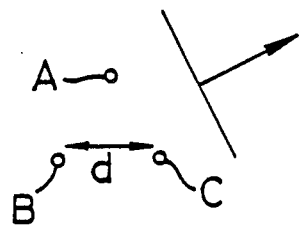

If the transducers form an equilateral triangle (FIG. 6) then it can be shown that if $t_1$ is the time difference for A to B and $t_2$ is the time difference for A to C then $$\tan \theta = \frac{1}{\sqrt{3}} \frac{(t_1 + t_2)}{(t_1 - t_2)}$$

The time differences can become negative and this is allowed for in the electronic circuitry shown in FIG. 1.

It is possible to calculate the velocity at which the shock wave expands in the target plane ($V_e$) from the time difference measured at each group of transducers. For a triangular array $$t_1^2 + t_2^2 + (t_1 - t_2)^2 = 1.5 \frac{d^2}{V_e^2}$$

and a similar formula and can be derived for other configurations. As $V_e$ depends on the velocity of the bullet it is possible to detect when a bullet has an anomalous speed such as might occur when using a faulty bullet or when a ricochet occurs.

An alternative more accurate method of determining bullet velocity is to add a fourth transducer to each triangular array. This fourth transducer is located out of the plane of the other three along the direction of travel of the projectile. The difference between the time of arrival of the shock wave at the group of three transducers and its time of arrival at the fourth transducer can then be used to measure the velocity of the projectile.

The above explanations have been made assuming a plane shock wave front. A correction has to be made for the curvature of the shock wave. In the case of an equilateral array this is (to a first order);

$$\Delta (\tan \theta) = \frac{(3 \tan^2 \theta - 1) d}{4 \sqrt{3} \times (4 \tan^2 \theta)}$$

where x is the horizontal distance from the array centre to the projectile position. The position error corresponding to this correction is nearly independent of the distance from the array to the projectile position and the correction needs to be made in a practical system. A more accurate formula can be evaluated but for most cases the first order version given above is sufficient.

As will be apparent the computing equipment 30 evaluates two directions, one for each group 10,11 of transducers. If $\theta 1$ represents the direction from the first group to the projectile trajectory, and $\theta 2$ represents the direction from the second group to the projectile trajectory then referring to FIG. 7 the following two equations express the position of the trajectory relative to X Y co-ordinates.

$$x = L \frac{(\tan \theta_2 - \tan \theta_1)}{(\tan \theta_1 + \tan \theta_2)}$$

$$y = 2L \frac{\tan \theta_1 \cdot \tan \theta_2}{\tan \theta_1 + \tan \theta_2}$$

Figure 7:
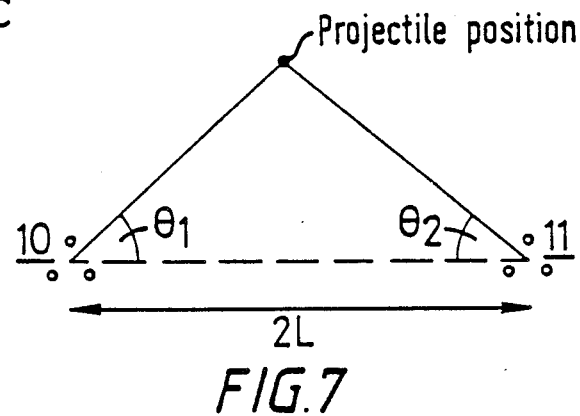

In these equations 2L is the spacing between the groups as shown in FIG. 7 and is a known parameter which is stored in the computing equipment. The computing equipment can therefore evaluate the x and y according to the above equation. On the basis of these calculated values the device 30 can drive a display or a printer to provide a visible indication of the position information.

Shots off target can be measured but the accuracy is reduced. The two sets of transducers do not necessarily have to be either side of the target but this is the preferred position.

It will be appreciated that the calculations referred to in the above explanation are all carried out in the computing device 30. The way in which these can be carried out will be apparent to a person skilled in the art and therefore details of the way in which this is performed is not given here.

It should be noted that measurement of shot position in the horizontal direction becomes less accurate as y becomes small. The accuracy can be improved by measuring the time difference between two transducers one from each set. In FIG. 3 this is shown as time $t_5$ and is measured by the timer 28C. This requires an estimate of $V_e$ everywhere except the centre of the target since $$((L+x)^2+Y^2)-((L-x)^2+Y^2)=(V_e t_5)^2$$

$$(L+x)^2-(L-x)^2=(V_e t_5)^2$$

$V_e$ can be calculated using the formula above.

Thus it will be seen that the arrangement of transducers described enables the projectile position to be calculated in a manner which is independent of the velocity of sound. Any transducer array that has the transducers in the plane of the target has this property as long as there are at least four transducers and they are not in a straight line. The configuration described has the advantage of being practical and accurate.

In the particular arrangement described and shown with reference to FIG. 1 the positions of the transducers should be controlled to better than 0.001d. The variability of the response time of the transducers (from shock wave arrival to electrical output) should also be less than 0.0006 d/c. If these figures can be achieved for L=1m then accuracies of around 2 mm can be achieved for the trajectory position.

Figure 8:
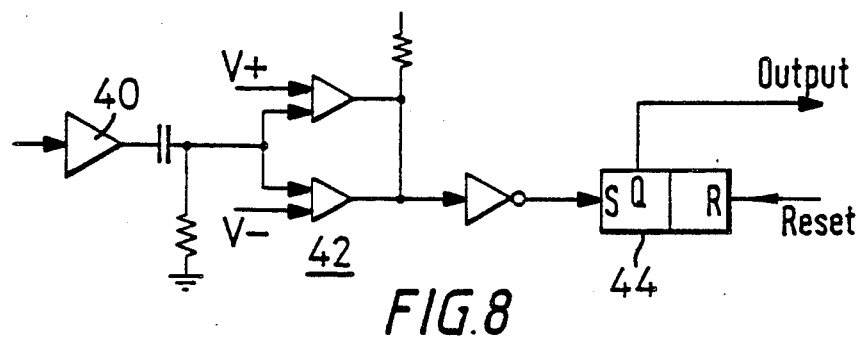
FIG. 8 and 9 show in more detail parts of the circuit of FIG. 1.

Referring to FIG. 8 each of the circuits 26 includes an AC coupled amplifier 40, a comparator 42 and a latch 44. The output of each transducer is amplified at 40 and if it exceeds the preset comparator level in either polarity the latch 44 is latched to provide an output on line 45 to the respective timer 28.

Figure 9:
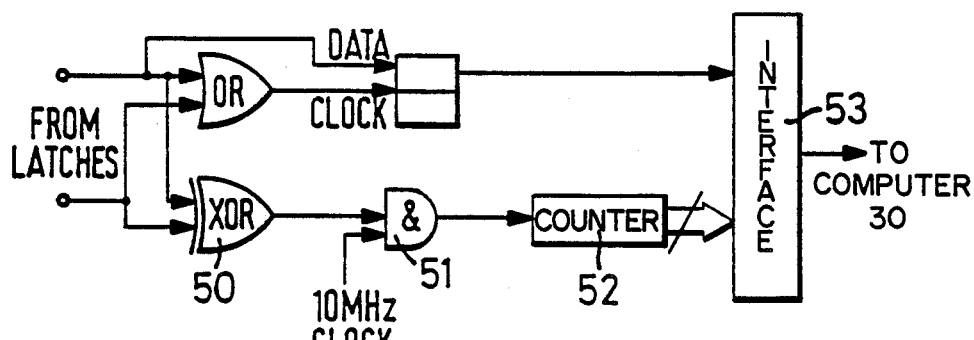

An example of the circuitry for each timer is given in FIG. 9. The inputs from two of the latches are applied to an exclusive OR gate 50 the output of which is connected as an input to an AND gate 51. The other input to the AND gate 51 is a 10 mHz clock. The arrangement is such that clock signals are counted by a counter 52 for the time interval between the appearance of one latch input and that of the other latch input. The count of the counter 52 is fed to the computing equipment via an interface 53.

Figure 10:
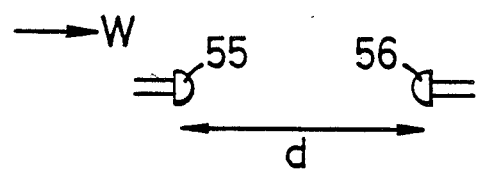
FIG. 10 illustrates a modification of the apparatus of FIG. 1.

The above embodiment can be modified to provide a correction for cross-wind as follows. Two piezoelectric transducers 55, 56 (FIG. 10) are located in the cross-wind close to the target area. The transducers are spaced horizontally by a distance d, typically 300 mm. The transducer 55 is pulsed to transmit a signal which is received at transducer 56. The transit time T1 of the pulse can be measured by a counting technique. Similarly if transducer 56 is pulsed and the pulse sensed by the transducer 55 a transit time T2 can be measured. If the velocity of sound in air is c and the cross-wind component between the transducers is W then $$T1 = \frac{d}{c + w} \quad T2 = \frac{d}{c - w}$$

$$\therefore W = \frac{d}{2} \left( \frac{1}{T1} - \frac{1}{T2} \right)$$

The cross wind component can be used to correct the computed angle of $\theta$. In the target plane the effective velocity of sound is the expansion velocity $V_e$. If $\phi$ is the corrected value of $\theta$ then $$\tan \theta = \sqrt{\frac{\tan^2 \theta (1 + W/Ve)^2}{1 + \tan^2 \theta - \tan^2 \theta (1 + W/Ve)^2}}$$

It will be appreciated that the above evaluation can be carried out by the computing equipment shown in FIG. 1.

Figure 11:
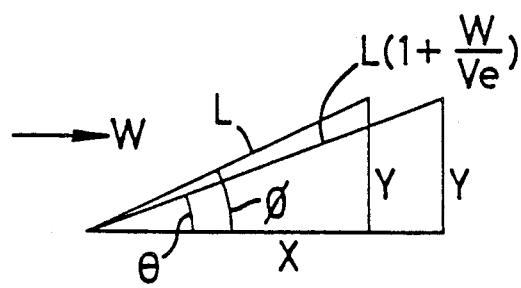
FIG. 11 illustrates the use of the device of FIG. 10 to correct for cross wind.

The derivation of $\phi$ can be understood from FIG. 11. A cross wind W of the direction shown has the effect of making trajectory appear further away than it is. In FIG. 11

$\theta$ is measured angle without correction
W is cross-wind component
Ve is expansion velocity of shock wave
$\phi$ is correct angle.

$$\sin \theta = \frac{Y}{L(1 + W/Ve)} \cdot \sin \phi = \frac{Y}{L}$$

$$\sin \theta = \frac{\sin \phi}{L(1 + W/Ve)}$$

Only $\tan \theta$ has been evaluated by the computing equipment $$\text{Now } \sin \theta = \frac{\tan \theta}{\sqrt{1 + \tan^2 \theta}}$$

$$\therefore \tan \phi = \sqrt{\frac{\tan^2 \phi (1 + W/Ve)^2}{1 + \tan^2 \theta - \tan^2 \theta (1 + W/Ve)^2}}$$

and can therefore be evaluated by the computing equipment. For a cross-wind in the opposite direction $$\tan \phi = \sqrt{\frac{\tan^2 \theta (1 - W/Ve)^2}{1 + \tan^2 \theta - \tan^2 \theta (1 - W/Ve)^2}}$$

Figure 12:
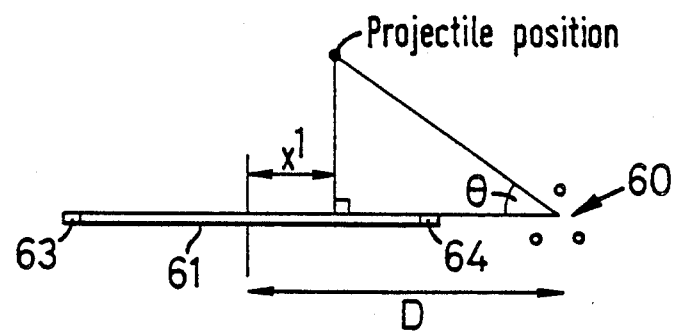
FIG. 12 is a schematic illustration of another embodiment in accordance with the present invention.

Another embodiment of the invention is shown in FIG. 12. This embodiment derives the position of a projectile passing through the target area by using a single triangular transducer array 60 and a single rod type sensor 61 such as that described in UK Patent Specification No. 1371173. The rod 61 has mounted at each end thereof a transducer 63,64. The rod is mounted in a horizontal plane below the target area so that it is not in the path of a projectile. The transducers 63,64 and the transducers of the array 61 are connected to computing equipment (not shown) in a manner similar to that of FIG. 1.

The array 60 is used to derive an angle $\theta$ in the manner already described with reference to FIG. 1. The rod 61 is used to derive an x coordinate for the projectile trajectory as follows.

A shock wave striking the rod 61 causes mechanical vibrations to propagate along the rod. These mechanical vibrations are sensed by the transducers 63,64 which convert the mechanical vibrations into electrical signals.

Such electrical signals are used to control a counter so that it counts clock signals for a time interval which begins with the sensing a mechanical vibration by one of the transducers 63,64 and ends with the sensing of a mechanical vibration by the other transducer. Referring to FIG. 12 the position X at which the shock wave struck the bar can be evaluated by the computing equipment since $x^1 = dt \, V_B$ where $V_B$ is the velocity of sound in the bar and dt is the time interval represented by the count.

The y coordinate of the projectile can be evaluated as follows $$Y = (D - x^1) \tan \theta$$

Thus the x and y coordinates are evaluated by the computing equipment and can be output to a display and/or printer as already described.

We claim:

1. Apparatus for determining the position within a target area of the trajectory of a projectile travelling at a supersonic velocity to said target area, said apparatus comprising:
   a plurality of transducers, said transducers being so arranged and disposed that they form two spaced-apart triangular groups which are associated with the plane of the target area through which the projectile passes,
   each transducer being arranged to convert the mechanical impulse of a shock wave from the projectile into an electrical signal, and
   processing means connected to receive said electrical signals and arranged to compute from said signals the direction of the projectile from each group of sensors, and to compute the position of the trajectory of said projectile within said target area in a coordinate system from said computed directions.

2. Apparatus according to claim 1 wherein said transducers comprise two spaced groups each comprising three transducers, the spacing of said groups being greater than the spacing of the transducers in each group.

3. Apparatus according to claim 2 wherein the triangular arrangement is a right-angled triangle.

4. Apparatus according to claim 2 wherein the triangular arrangement is an equilateral triangle.

5. Apparatus according to claim 2 including a fourth transducer arranged out of the plane of the other three so that the velocity of the projectile can be derived.

6. Apparatus according to claim 1 further including:
   means for sensing a cross-wind component,
   said processing means receiving electrical signals from said means for sensing and changing said computed direction on the basis of said received signals.

7. A method of determining the position within a target area of a projectile travelling at a supersonic velocity using a plurality of transducers which are so arranged and disposed that they form two spaced-apart triangular groups associated with a target area through which the projectile passes, the method comprising:
   sensing the impulse of a shock wave from the projectile at the transducers,
   processing the sensed impulses to derive the direction with respect to the moving projectile as it passes through the target area from each group of sensors, and
   evaluating and locating the position of the moving projectile within said target area as it passes through the target area.

8. Apparatus for determining the position of a projectile within a target area as it travels at a supersonic velocity through the target area, said apparatus comprising:
   a longitudinally extending member arranged in a generally horizontal plane below the target area,
   a pair of transducers located on said member, said transducers being at a given distance apart along the length of the member and each transducer being capable of transducing mechanical vibration into electrical signals,
   a triangular array of transducers which is associated with a plane containing the target area,
   each of said transducers being capable of converting the mechanical impulse of a shock wave into an electrical signal, and
   means for processing signals from said transducers to provide date indicative of the position of the projectile within the target area as it passes therethrough.

9. Apparatus according to claim 8 wherein signals from the triangular array are used to derive data indicative of the direction from the array to the projectile trajectory and signals from the longitudinal member transducers are used to derive data indicative of the x position of the trajectory in an x-y coordinate system.

10. A method of determining the position of a projectile travelling at a supersonic velocity through a target area which comprises:
using a triangular array of transducers to sense the impulse of a shock wave from the projectile to derive data indicative of the direction of the projectile trajectory from the array,
using a rod type sensor to derive data indicative of the position of the trajectory on an axis of a rectangular coordinate system, and
computing the position on another axis of said coordinate system from the derived data from the rod type sensor.

11. Apparatus for determining the hit location in a target area through which a projectile passes, said apparatus comprising:

a generally planar target area;
a first group of plural first transducers located at a first predetermined position in a plane substantially parallel with said target area to intercept a shock wave emanating from the projectile upon its passage through the target area with the shock wave striking different ones of the first transducers at different times;
a second group of plural second transducers also located at a second predetermined position in a plane substantially parallel with said target area to intercept a shock wave emanating from the projectile upon its passage through the said target area with the shock wave striking different ones of the second transducers at different times;
timing and computing circuits connected to receive differently timed electrical signals from said first and second transducers and to responsively compute the direction from each said group to said hit position and, from the intersection of such computed directions, to locate the hit position within the said target area through which the projectile has passed.

* * * * *